Sheet 1, 2 Sheets.

D. P. Sharp.

Horse Rake.

No. 3,450. Reissued May 18. 1869.

Witnesses Wm Irwin
Thos Irwin

Inventor
D P Sharp
By Munn & Co.
Attys

Sheet 2, 2 Sheets.

D. P. Sharp,

Horse Rake.

No. 3,450. Reissued May 18. 1869.

Witnesses Wm Irwin
Fred Fusch

Inventor
D P Sharp
Byrnham & Co.
Attys.

United States Patent Office.

D. P. SHARP, OF ITHACA, NEW YORK.

*Letters Patent No.* 51,486, *dated December* 12, 1865; *reissue No.* 3,450, *dated May* 18, 1869.

IMPROVEMENT IN HORSE-RAKES.

The Schedule referred to in these Letters Patent and making part of the same.

*To all whom it may concern:*

Be it known that I, D. P. SHARP, of Ithaca, in the county of Tompkins, and State of New York, have invented a new and improved Horse-Rake; and I do hereby declare that the following is a full, clear, and exact description thereof, which will enable others skilled in the art to make and use the same, reference being had to the accompanying drawing, forming part of this specification, and in which—

Figure 1:
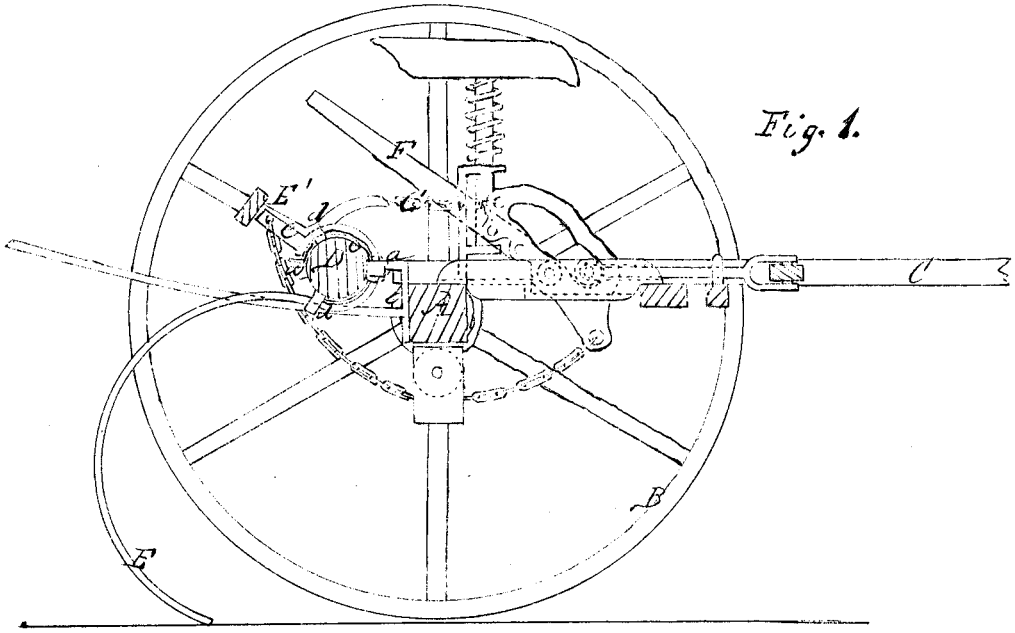
Figure 2:
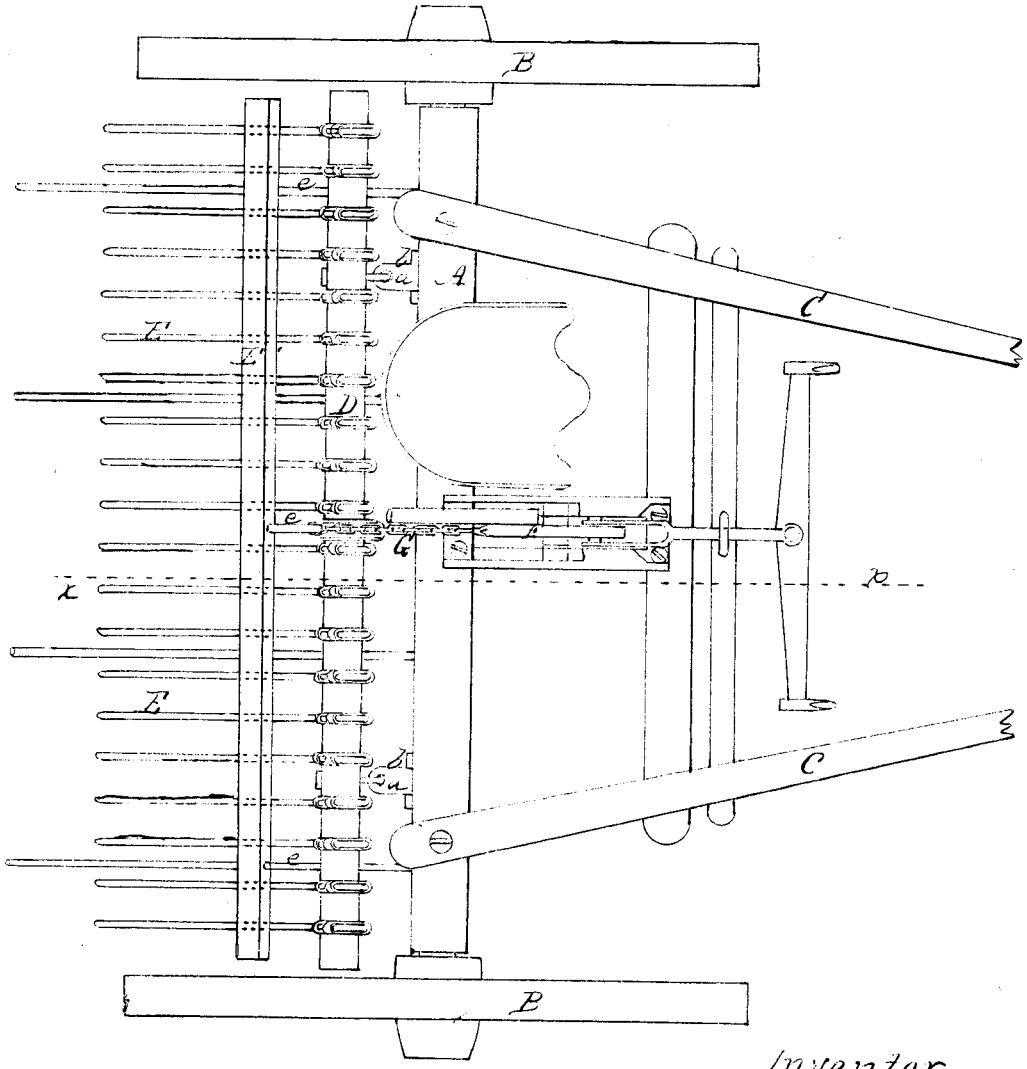

Figure 1 is a side sectional view of a horse-rake, having my invention applied to it, under an arrangement of the rake-head other than or independent of the axle, by way of more clearly exhibiting my novel mode of attaching or hanging the rake-teeth, said section being taken as indicated by the line *x x* in fig. 2.

Figure 2, a plan or top view of the same.

Figure 3:
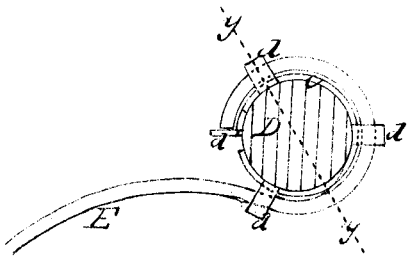

Figure 3, an enlarged transverse section of said rake-head.

Figure 4:
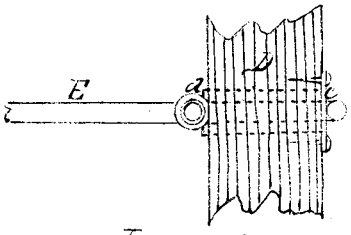

Figure 4, a section of fig. 3, taken in the line *y y*.

Similar letters of reference indicate like parts.

This invention relates to a new and useful improvement in horse-rakes, and of that class in which wire teeth are used.

Said teeth have, previously to this my invention, been variously attached or hung, as, for instance, by hinge-joints, to the axle, or to an independent bar connected with the axle, so as to have an independent rising and falling motion, as well as a general one, by communicating a rocking motion to the axle or rake-head, which latter may or may not be the axle, so far as the methods previously referred to, as well as this, my invention, are concerned.

The object of my invention is to give increased security, steadiness, and firmness in the attachment of the rake-teeth to the head which carries them, without impairing the freedom of their independent action; and it consists in arranging the rake-teeth to oscillate for a limited distance independently of each other around the rake-head as a centre of motion, instead of working from or around independent centres which lie to one side of the rake-head.

Referring to the accompanying drawing—

A represents an axle having a wheel, B, at each end, and thills, C C, attached, and D is the rake-head, here shown as being other than and independent of the axle.

Said rake-head is represented as of cylindrical form, and is connected by eye-bolts, *a*, to brackets, *b*, at the rear of the axle, to admit of the rake-head rocking or turning freely, in order that the rake-teeth may be raised collectively, for the purpose of discharging their load.

E represents the rake-teeth, which are constructed of wire, and, so far as their general shape is concerned, bent in the usual form; but they differ from previous constructions in their upper ends, being curved or bent so as to form a circular fit around the rake-head D, which passes through them and serves as a centre of motion for them to oscillate on or around.

Said rake-head has metal plates, *c*, attached circumferentially to it at suitable and equal distances apart, and these plates have eyes *d* formed on them, to serve as guides or sockets for the upper ends of the teeth to work in, and admit of the teeth turning on the rake-head. (See fig. 3.)

The ends of the upper bent or curved portions of the teeth, when the latter are turned to their fullest extent, bear against stops *d'* attached to the rake-head.

These stops limit the turning-movement of the teeth on the rake-head in a downward direction, the upward direction being limited by the teeth striking against a bar, E', which is attached to the rake-head by arms *e*.

By this means of attaching the teeth to the rake-head, an independent movement is allowed each tooth on the rake-head, and at the same time the teeth are all raised simultaneously, in order to discharge their load, in consequence of the stops *d'* bearing against the upper ends of the teeth when the head D is turned, which is accomplished by means of a lever, F, connected to an arm of the head by a chain, G.

The improvement is extremely simple, and it admits of the teeth being readily attached to and detached from the rake-head, obviates the tendency of the teeth to break or bend under obstructions which may be in their path, and renders the rake more substantial and durable.

Having thus described my invention,

I claim as new, and desire to secure by Letters Patent—

1. The rake-teeth, arranged to oscillate for a limited distance independently of each other, around the rake-head as a fulcrum or bearing, substantially as specified.

2. The combination of the eyes or sockets *d d d* with the metallic plates *c*, and coiled teeth, E, all arranged to operate as and for the purposes specified.

3. The stops *d'*, when used in connection with the teeth, applied to the rake-head, substantially as and for the purpose specified.

D. P. SHARP.

Witnesses:

H. R. HIBBARD,

S. L. VOSBURGH.